United States Patent
Kuribayashi et al.

(10) Patent No.: US 8,020,928 B2
(45) Date of Patent: Sep. 20, 2011

(54) SEAL MECHANICAL HOLDER FOR SUNROOF ASSEMBLY

(75) Inventors: Akihiko Kuribayashi, Dublin, OH (US); Brent Nathaniel Gaertner, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 12/482,197

(22) Filed: Jun. 10, 2009

(65) Prior Publication Data
US 2010/0313486 A1    Dec. 16, 2010

(51) Int. Cl.
*B60J 7/22*       (2006.01)
*B60J 10/12*      (2006.01)

(52) U.S. Cl. .................. 296/214; 49/493.1; 296/216.07
(58) Field of Classification Search ................. 296/217; 49/489.1, 496.1, 493.1
See application file for complete search history.

(56) References Cited

U.S. PATENT DOCUMENTS

| | | | |
|---|---|---|---|
| 3,461,610 A | 8/1969 | Peters et al. | |
| 4,180,957 A * | 1/1980 | Rantala | ............................ 24/297 |
| 4,395,939 A | 8/1983 | Hough et al. | |
| 4,487,449 A | 12/1984 | Igel et al. | |
| 4,521,937 A | 6/1985 | Fisher | |
| 4,666,206 A | 5/1987 | Hough | |
| 5,826,934 A | 10/1998 | Wooten | |
| 5,950,366 A | 9/1999 | Uhlmeyer | |
| 6,705,673 B1 | 3/2004 | Sorensen et al. | |
| 6,932,422 B2 | 8/2005 | Ota et al. | |
| 6,966,603 B2 * | 11/2005 | Grimm et al. | ................. 296/217 |
| 2006/0230686 A1 | 10/2006 | Plum et al. | |

FOREIGN PATENT DOCUMENTS

| | | |
|---|---|---|
| DE | 100 46 122 | 7/2005 |
| DE | 10046122 | 7/2005 |

* cited by examiner

*Primary Examiner* — Dennis Pedder
(74) *Attorney, Agent, or Firm* — Rankin Hill & Clark LLP

(57) ABSTRACT

A seal attachment assembly for a vehicle sunroof comprises a seal including one of an outward extending protrusion and hook and a deflector body including the other of the protrusion and the hook. A cooperative relationship between the protrusion and the hook resists a movement of the seal away from the vehicle body. A double-sided adhesive tape secures a planar base portion of the seal to the vehicle body. A resilient lip extends outward from the seal in a direction away from the sunroof opening along an outer edge of the planar base portion. This resilient lip maintains an elastic engagement with the vehicle body to shelter the double-sided tape from exposure to elements. The protrusion extends outward from the seal along an inner edge of the planar portion in a direction toward the sunroof opening. A terminal end of the protrusion includes a rounded bulb section. An outer leg of the deflector body extends beyond the planar base portion of the seal. The outer leg terminates at an outward extending hook; the hook catches the rounded bulb of the protrusion of the seal.

21 Claims, 4 Drawing Sheets

SEAL MECHANICAL HOLDER FOR SUNROOF ASSEMBLY

BACKGROUND

The present disclosure is directed toward a seal attachment assembly for securing a sunroof seal to a vehicle body.

An existing sunroof seal assembly is shown in FIG. 1 including a seal body 120 that overlies an entire perimeter formed by an opening in a vehicle roof panel. The seal body 120 affixes to the vehicle body 140 to prevent penetration of moisture, dust particles, etc. into a cabin of the vehicle when a glass sunroof panel (not shown) is in a closed position. A deflector catcher 160, which supports a corresponding extendable and collapsible deflector 180 (e.g., a flexible deflector), affixes to a front edge of the opening to deflect winds when the glass sunroof panel retracts to an open position.

A double-sided adhesive tape 200 is often used to secure a planar undersurface of the seal body 120 to an adjacent exterior surface of the vehicle roof panel 140. This double-sided tape 200 is usually the only mechanism provided to maintain attachment of the seal to the vehicle body. One complication that occurs with existing sunroof seal assemblies is that the adhesive fails on occasion. This failure can result in potential leakage at the seal.

In particular, strength of the adhesive on the double-sided tape 200 can tend to weaken as it is exposed to humidity and moisture. The double-sided tape 200 can lose integrity at either of its surfaces as its strength is weakened by prolonged exposure. A disadvantage associated with the existing sunroof assemblies is that the seal 120 tends to release from the vehicle body 140 when the double-sided tape 200 weakens.

Repeated contact between the glass sunroof panel and the seal 120 is another reason the seal body 120 can tend to detach from the vehicle body 140. As the slideable glass sunroof draws in to a closed position, a front edge or an inner surface of the glass portion can push against the arcuate sealing profile of the seal 120. Repeated urging by the glass sunroof panel against that profile can cause the seal 120 to lift away from the vehicle body 140. A disadvantage associated with released seals is that moisture, dust, air and wind, or other debris can penetrate the seal and enter the vehicle cabin.

SUMMARY

A first exemplary embodiment of the disclosure is directed toward a seal attachment assembly for maintaining integrity of a seal around a perimeter of a sunroof opening on a vehicle body. The seal attachment assembly comprises a seal including one of an outward extending protrusion and hook. The seal attachment assembly further comprises a deflector body including the other of the protrusion and the hook. A cooperative relationship between the protrusion and the hook resists a movement of the seal away from the vehicle body.

A second exemplary embodiment of the disclosure is directed toward a seal attachment assembly for a vehicle sunroof, which comprises a seal, a double-sided tape, and a deflector catcher. The seal has an arcuate sealing profile extending upward from a planar base portion. The seal includes a protrusion extending outward from an inner edge of the planar base portion. The double-sided tape includes a first surface opposite a second surface. The first surface adheres to the planar base portion, and the second surface adheres to the vehicle body. The deflector catcher has a u-shaped portion forming a cavity for receiving a proximal end of a flexible deflector. The deflector catcher has a hook that cooperatively engages the protrusion of the seal to resist movement of the seal away from the vehicle body.

A third exemplary embodiment of the disclosure is directed toward a seal attachment assembly for securing a sunroof seal to a vehicle body, which comprises a seal having an arcuate sealing profile extending upward from a planar base portion and a deflector catcher having at least a u-shaped portion forming a cavity for receiving a proximal end of a flexible deflector. The seal includes a protrusion extending along an inner edge of the planar base portion and a resilient lip disposed along an outer edge of the planar base portion. The u-shaped portion of the deflector catcher includes an inner leg and a generally parallel outer leg, which both extend upward from opposing ends of a base. The u-shaped portion further includes a hook formed at a terminal end of the outer leg for cooperatively engaging the protrusion, to resist movement of the seal away from the vehicle body.

DETAILED DESCRIPTION

Figure 2:
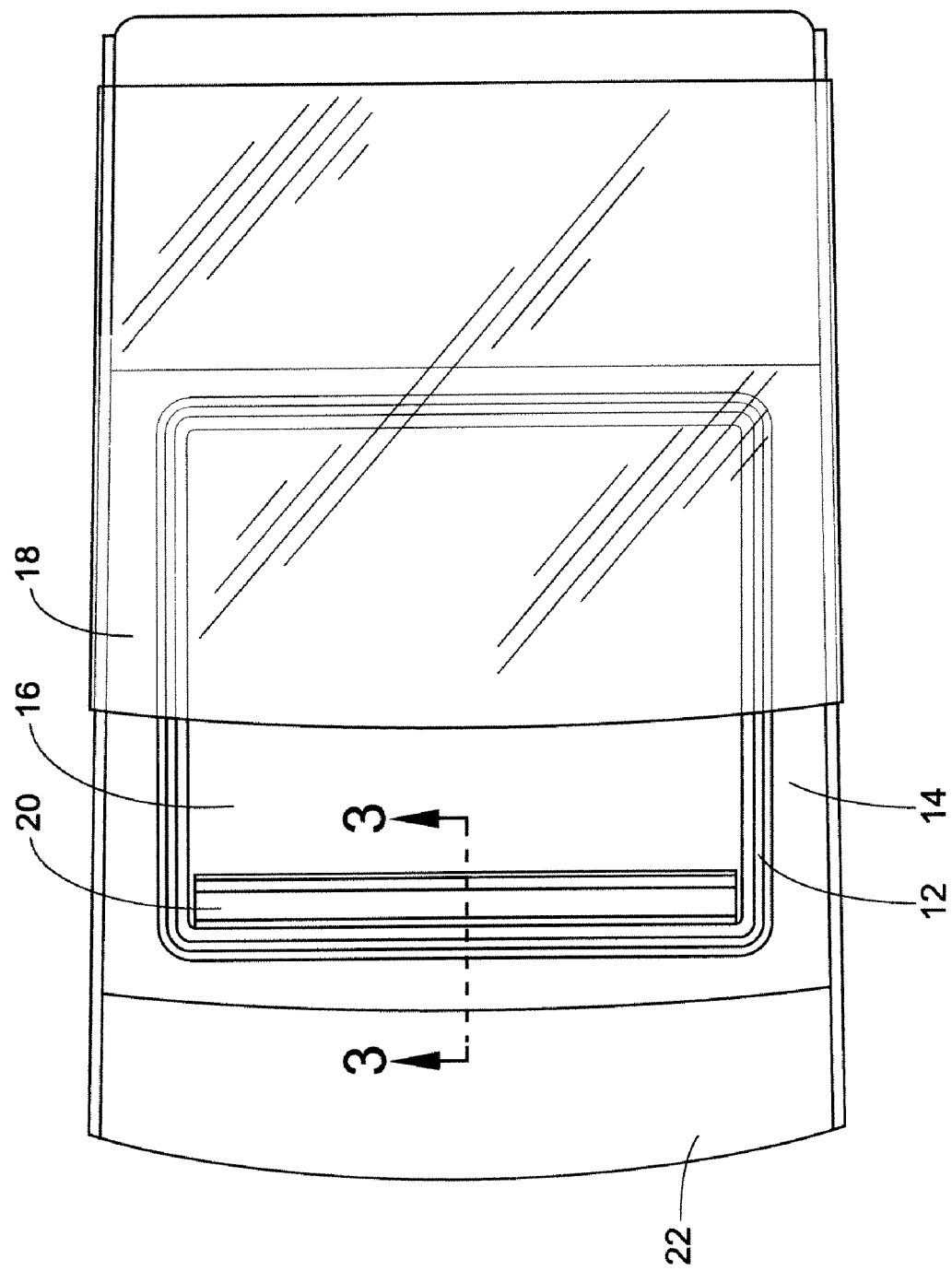
FIG. 2 is a top plan view of a vehicle roof panel incorporating a seal attachment assembly according to an embodiment of the present disclosure.
Figure 3:
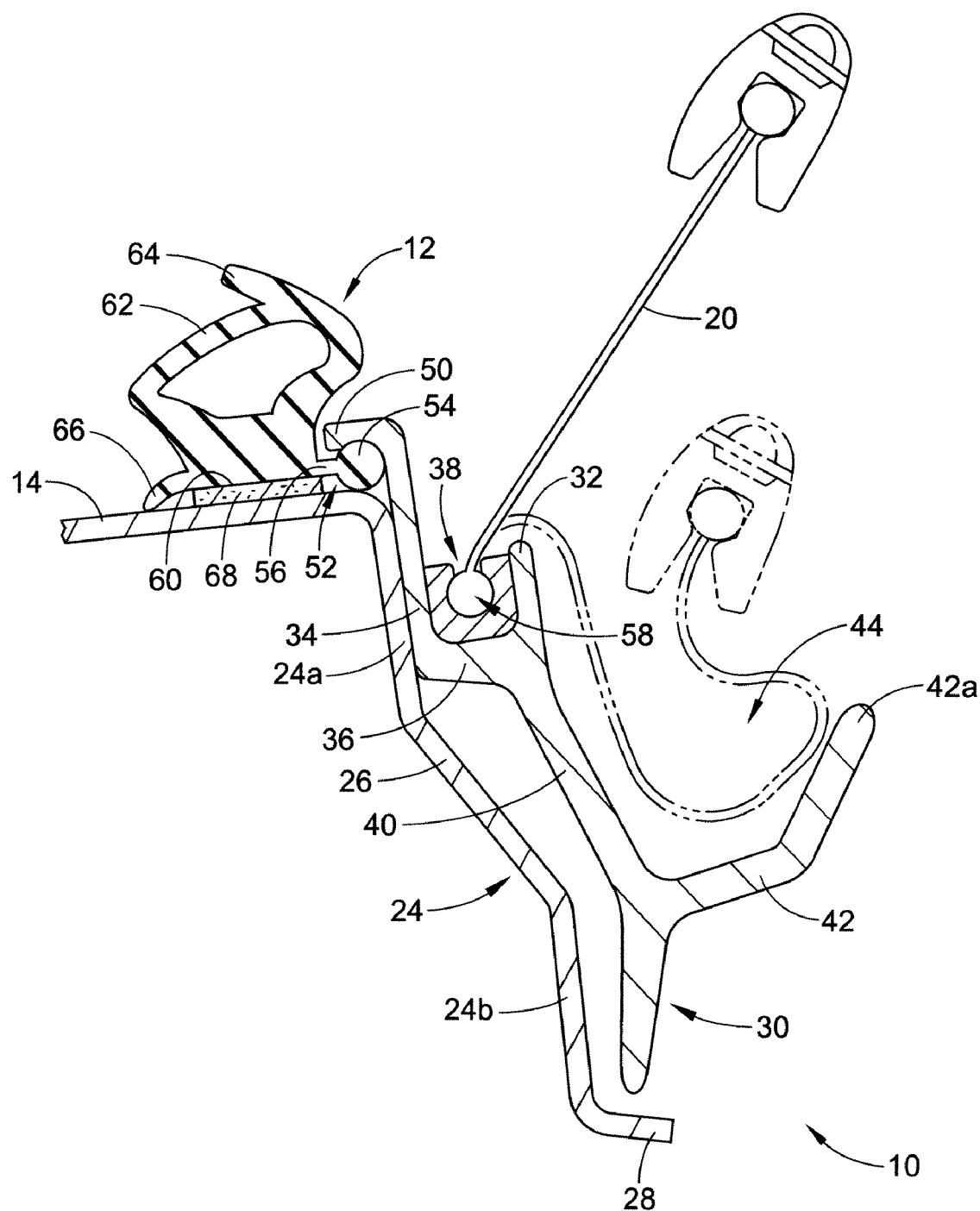
FIG. 3 is a cross-sectional side view of the seal attachment assembly taken along line 3-3 of FIG. 2; and, FIG. 4 is a perspective view of a partial length of the seal attachment assembly of FIG. 2.
Figure 4:
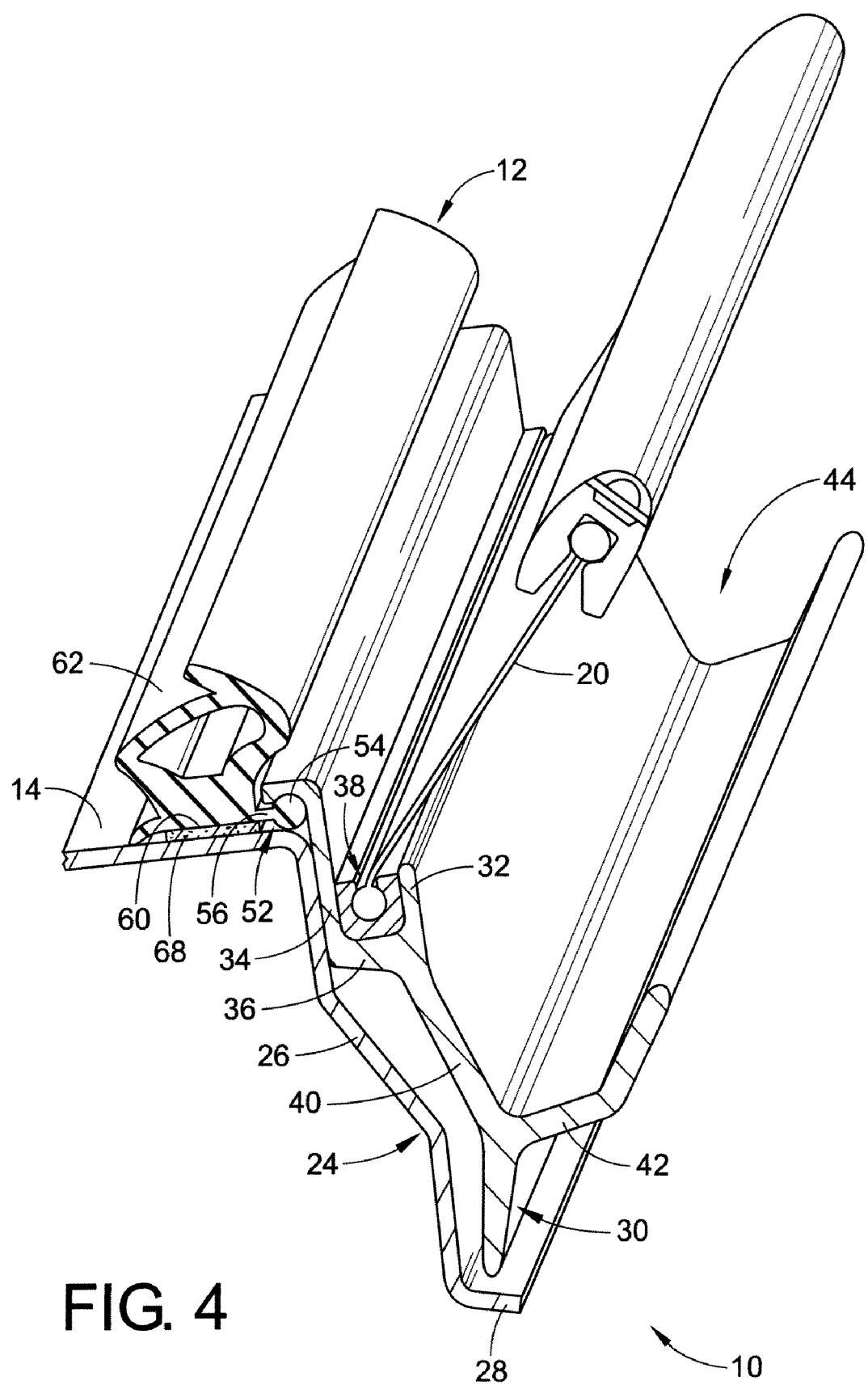

FIGS. 2-4 illustrate a seal attachment assembly 10 according to one embodiment of the disclosure. The seal attachment assembly 10, which can be referred to as a seal mechanical holder, maintains integrity at a seal 12 provided around a perimeter of an opening on a vehicle body (e.g., a sunroof opening on a vehicle roof).

FIG. 2 illustrates a top-plan view of a vehicle body having a vehicle roof panel 14. Seal 12 secures to an exterior surface of the vehicle roof panel 14. In particular, the seal 12 can secure around an opening 16 in the vehicle roof panel 14, which provides the passenger cabin of the vehicle access to both air and light. In one embodiment, the seal 12 can be secured to a corresponding frame member, which itself is permanently secured about the sunroof opening 16. A glass sunroof panel 18 slides rearward along a length of the roof panel 14 to permit air movement or light into the cabin. The glass sunroof panel 14 shown in FIG. 2 is a panoramic sunroof panel; however, the disclosure is not limited to any one type of sunroof. The glass sunroof panel 18 can be an electric actuated panel which slides forward and retracts rearward to cover and to open the sunroof. The glass sunroof panel 18 can alternatively be a manual-actuated panel which extends upward and retracts downward to open and to close the sunroof.

A length of the glass sunroof panel 18 can extend along a portion of or an entire width of the vehicle roof panel 14. There are no limitations made herein to a style of, to dimensions of, or to automations or mechanisms of the sunroof structure. An extendable and collapsible deflector 20, which deflects wind and mitigates wind noise, extends along a forward facing edge of the opening 16. This deflector 20 situates posterior to the seal 12, while the front windshield 22 of the vehicle situates anterior to the seal.

FIG. 3 illustrates a cross-sectional view of the main seal assembly 10 taken along line 3-3 of FIG. 2. More specifically, a cross-section of the main seal assembly 10 is shown for the front edge of the sunroof opening of which the deflector 20 is situated. In the illustrated embodiment, the generally planar surface of the vehicle roof panel 14 truncates downward at the opening to a perimeter wall 24. For at least the front edge of the sunroof opening, a middle width of the perimeter wall 24 includes an inward angled step 26. More particularly, the perimeter wall 24 includes a first perpendicular portion 24*a*, which extends downward toward the vehicle passenger cabin from a first terminal end. The first perpendicular portion 24*a* extends from where the wall meets an inner edge of the planar surface of the vehicle roof panel 14 to a second, opposite end. The second, opposite end of this first perpendicular portion 24*a* terminates at a first bend in the perimeter wall 24, where an angled portion, i.e., the step 26, continues to extend both inward and downward toward a second nearly perpendicular portion 24*b*. The second perpendicular portion 24*b* continues to extend downward until it terminates at an edge where the perimeter wall 24 meets an inward extending flange 28. This inward extending flange 28 is nearly perpendicular to the perimeter wall 24.

The roof panel 14, the perimeter wall 24, and the flange 28 are shown in FIG. 3 as being manufactured as integral components of the vehicle body; however, other embodiments are contemplated. For example, an alternate embodiment can include the roof panel, the perimeter wall, and the flange as part of a frame member (not shown) that secures to the vehicle body at the perimeter of the sunroof opening. Furthermore, the perimeter wall 24 can comprise different dimensions, widths, bends, and steps, etc., while still accommodating a function of the assembly disclosed herein; namely, the present main seal assembly 10 can be utilized on perimeter walls that include strictly linear lengths, partial or entire arcuate portions, etc., so long as there exists at least one portion of an inner surface of the perimeter wall 24 available for an adjacent portion of a deflector catcher 30 (also referred to herein as the "deflector frame").

The deflector catcher 30 nestles along the front edge of the perimeter opening 16 (see, FIG. 2). As is shown in FIG. 3, a profile of the exterior surface of the deflector catcher (i.e., the surface facing the front end of the vehicle), coincides at portions with a profile of an inner-facing surface of the perimeter walls 24. The deflector catcher 30 comprises a u-shaped portion 32, 34, 36 formed from an inner leg 32 and a generally parallel outer leg 34, which both extend upward from opposing ends of a generally perpendicular base 36. The unshaped portion 32-36 forms a cavity 38 which receives a proximal end 58 of the flexible deflector 20.

A first leg 40 extends downward from an edge where the inner leg 32 meets the base 36. This first leg 40 is generally congruent with the perimeter wail 24. A clearance exists, however, between the first leg 40 and the perimeter wall 24 because the base 36 removes the deflector catcher 30 a distance therefrom. The distal end of the first leg terminates immediate the inward flange 28 of the perimeter wall 24. In this manner, a majority portion of the deflector catcher 30 is not exposed in the vehicle passenger cabin.

A second leg 42 extends inward the opening from a middle portion of the first leg 40. This second leg 42 can extend inward from a bend in the first leg 40, which is congruent with a bend in the perimeter wall 24 where the angled portion 26 meets the second perpendicular portion. This second leg 42 extends generally horizontally inward, and then it bends to extend both inward and upward. The second leg 42 can alternatively be a generally arcuate, i.e., concave, shaped leg.

In the illustrated embodiment, the second leg 42 terminates at a height below the u-shaped portion 32-36. A distal end 42*a* of the second leg 42 can rest in generally a same horizontal plane as the base 36 of the u-shaped portion 32-36. The first leg 40 and the second leg 42 form a deflector retaining cavity 44, which receives the deflector 20 when it is in a collapsed position (shown in phantom). The first leg 40 and the second leg 42 cradle the collapsed flexible deflector 20; the first leg and second leg conceal the collapsed flexible deflector 20 from passengers seated in the interior cabin of the vehicle. In this manner, a closed glass window panel appears rather flush with the ceiling of the interior cabin, with an exception of the second leg 42 of the deflector catcher, which is designed to appear inconspicuous.

Figure 1:
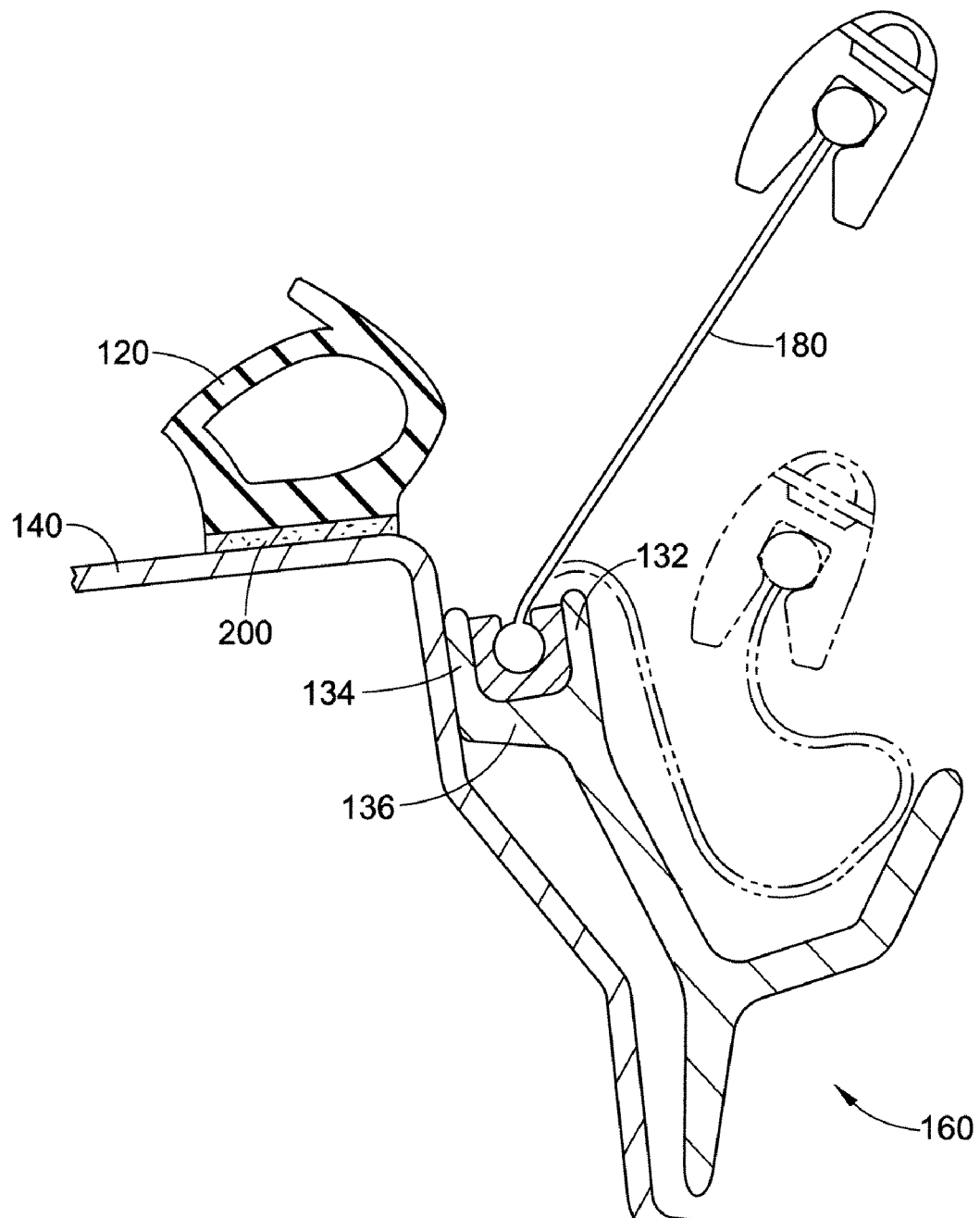
FIG. 1 is a cross-sectional side view of a prior art seal attachment assembly.

The prior art seal assembly shown in FIG. 1 includes a u-shaped cavity formed from an inner leg 132 and a parallel outer leg 134 that connect by a perpendicular base 136. The inner leg 132 and the outer leg 134 are generally equal in height. Distal ends of the inner and outer legs 132, 134 rest in a plane that is beneath a height of the exterior vehicle roof panel 140.

The deflector catcher 30 of FIGS. 3-4 includes a modified outer leg 34 design; namely, the inner leg 32 and the outer leg 34 are of unequal heights. More specifically, a height of the outer leg 34 is greater than a height of the inner leg 32. And more specific yet, a height of the outer leg 34 extends beyond a plane to which the vehicle roof panel 14 rests. A distal end of the outer leg 34 extends past the opening, and it situates at an exterior of the vehicle.

A further feature associated with the modified outer leg 34 of the deflector catcher 30 is one of an outward extending protrusion and hook. The main seal assembly 10 shown in FIG. 3 includes a hook 50 at the distal end of the outer leg 34. This hook 50 is outward extending toward a front end of the vehicle. Such an outward extending hook is not possible in the existing deflector catcher embodiments since the outer leg 134 extends adjacent the perimeter wall of a vehicle frame or the vehicle panel. Therefore, the height of the outer leg 34 must extend a distance beyond the vehicle roof panel sufficient to accommodate the entire hook 50 being situated above the vehicle roof panel 14. The hook 50 cooperates with a protrusion 52 on modified seal 12 of the main seal assembly 10.

This feature of an outward extending hook 50 is not limited to a deflector catcher body; rather, it can be situated on a garnish member (not shown) in alternative embodiments of the present disclosure. This garnish member is not limited only to decorative members; rather, the term "garnish" can include any vehicular component that is capable of working in conjunction with seal assemblies. The modified outer leg 34 that terminates with the hook 50 can be situated on a garnish member having at least a component with the following features: the hook comprised on an arm that extends approximately adjacent to the inner surface of the perimeter wall 24; and, wherein a distal end of the arm extends past the height of the opening. In this manner, it is namely the hook 50 of the present disclosure that is capable of cooperating with the corresponding seal 12. Because it is the hook 50 that will brace the seal, the hook can be situated on virtually any type of garnish members.

The seal 12 is affixed about the sunroof opening to impede penetration of moisture and of dust into the vehicle passenger cabin. In the illustrated embodiment, the seal 12 can extend around an entire perimeter of the opening 16; however, embodiments are contemplated in which the seal 12 can extend along at least one limited length of the perimeter. For example, in one embodiment the seal 12 extends along the perimeter of the sunroof opening that corresponds to the length for which the deflector 20 extends.

The seal 120 of FIG. 1 adheres to an exterior side of a vehicle roof panel by means of a double-sided adhesive tape 200. One limitation provided by the existing seal 120 is that it inadvertently detaches from the vehicle roof panel when the double-sided adhesive tape 200 weakens. The seal assembly 10 of the present disclosure includes a modified seal 12 design having mechanical components that reinforce securement of the seal 12 to the vehicle roof panel 14 to prevent detachment thereof.

The seal 12 shown in FIG. 3 includes a planar base portion 60 that secures to the exterior vehicle roof panel surface 14. An arcuate sealing profile 62 extends upward from the planar base portion 60. The arcuate profile 62 includes a jut 64 situated generally on its top surface. This jut 64 protrudes outward from the arcuate sealing profile 62 in a direction opposite the sunroof opening. There is no limitation made herein to a shape, to a size, or to dimensions of seal 12; rather, any seal can be utilized which functions in a similar manner to prevent moisture and dust from reaching the vehicle passenger cabin. At least the arcuate sealing profile portion 62 of the seal is formed from a pliable material. In one embodiment, the entire seal 12 is formed from a rubber or a similar acting elastomer.

A first feature for reinforcing the securement of the seal 12 to the vehicle roof 14 includes a resilient lip 66, which extends outward from the seal in a direction away from the sunroof opening 16. This resilient lip 66 more specifically extends along an outer edge of the planar base portion 60. The resilient lip 66 maintains an elastic engagement with the vehicle roof panel 14.

A double-sided adhesive tape 68 secures the seal 12 to the vehicle roof panel 14. A first surface of the double-sided tape 68 adheres to the planar base portion 60 while an opposite, second surface adheres to the exterior vehicle roof panel 14. A problem associated with utilizing double-sided adhesive tapes 68 as a sole means for securement is that one or both surfaces can weaken if moisture leaks into any space between the respective surface and the seal 12 or the vehicle roof panel 14. These weakened surfaces cause the seals of existing or prior art main seal assemblies to lift away from the vehicle roof panels.

More particularly in existing seal assemblies, moisture can leak between the respective surface and the seal 120 or the vehicle roof panel 140 at both the outer and inner edges of the double-sided adhesive tape 200. The seal assembly 10 of the present disclosure overcomes leakage at the outer edge of the double-sided tape 68 by means of the resilient lip 66 on the seal 12. This resilient lip 66 can engage the vehicle roof panel 14 to shelter the double-sided tape 68 from elements.

The inner edge of the double-sided tape 68 can be similarly sheltered by means of a second feature associated with the present seal 12. The seal 12 includes the other of the protrusion and hook. The seal 12 shown in FIG. 3 includes the protrusion 52 extending outward from the inner edge of the planar base portion 60. This protrusion 52 extends toward the sunroof opening in a generally same plane as the planar base portion 60, which is traverse that of the outer leg 34 of the deflector catcher 30. The protrusion 52 is not shown to extend beyond a vertical plane created by the perimeter wall 24 formed at the edge of the sunroof opening. Further extension into the space above the sunroof opening is blocked by means of the outer leg 34 of the deflector catcher 30.

The protrusion 52 terminates at a rounded bulb section 54. This rounded bulb section 54 includes a cross-sectional area that is greater than a leg 56 of the protrusion at the planar base portion 60. In one embodiment, a portion of the outer surface of the rounded bulb section 54 contacts the exterior surface of the vehicle roof panel 14. The rounded bulb section 54 can hence act as a shelter for the inner edge of the planar base portion 60 to prevent moisture from leaking between the first and second surfaces of the double-sided tape 68 and the seal 12 or the vehicle roof panel 14.

The hook 50 on the outer wall 34 of the deflector catcher 30 cooperates with the protrusion 52 of the seal 12 to resist any upward movement of the seal away from the vehicle roof panel 14. The hook 50 wraps around the rounded bulb section 54 to clasp the protrusion 52. The hook 50 can reach beyond the rounded bulb section 54 to press against the pliable arcuate profile 62 of the seal 12 (see FIG. 4). Both the hook 50 and the outer leg 34 further shield the inner edge of the double-sided tape 68 from moisture reaching any available crevice.

In another embodiment (not shown), the protrusion can be situated on the outer leg 34 of the deflector catcher 30 and the hook can be situated on the seal 12. The leg extending outward from an inner edge of the planar base portion 60 can terminate at a downward extending hook. In this embodiment, the leg can extend beyond the generally vertical plane to which the outer leg 34 rests. The leg 56 can extend generally horizontally toward the terminal hook, or it can extend upward at a slight incline. The hook can cooperate with a corresponding rounded-bulb section situated at a terminal end of the outer leg 34. To ensure that the cooperating protrusion-and-hook relationship prevents upward movement of the seal, a further embodiment can replace the rounded bulb section with an inward extending hook at a distal end of the outer leg 34. This inward extending hook can clasp the downward extending hook of the seal.

Further embodiments are contemplated in which the seal 12 is directly adhered to the exterior vehicle roof panel 14 (without use of a double-sided tape) by means of an adhesive or similar agent. The resilient lip 66 extending from the outer edge of the planar base portion 60 could continue to elastically engage the vehicle roof panel 14. In this manner, moisture is prevented from reaching the adhesive between the seal 12 and the vehicle roof panel 14.

A first advantage associated with the main seal mechanical holder assemblies disclosed herein is that they provide a countermeasure to maintain attachment of the main seal to the vehicle body when integrity of the double-sided tape is compromised. The hook on the deflector catcher clasps the protrusion of the seal to hold the latter seal in place when the double-sided tape fails to.

A second advantage associated with the main seal mechanical holder assemblies of this disclosure is that they provide a feature to shelter the double-sided tape from exposure to elements. The strength of the adhesive will not weaken in consequence of exposure to humidity and moisture.

A third advantage associated with the disclosed constructions for the main seal mechanical holder assemblies is that no additional components are required for assembly. The present disclosure furthermore requires no complex steps for assembly. The present disclosure provides a simple and an efficient improvement to both a quality of sunroof seal assemblies and a quality of performance of such assemblies for protection of the vehicle passenger cabin.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A seal attachment assembly for maintaining seal integrity around a sunroof opening on a vehicle body, said seal attachment assembly comprising:
a seal positioned on and attached to a generally horizontal surface of the vehicle body adjacent the sunroof opening, the seal including an outward extending protrusion overlaying and extending along the generally horizontal surface; and,
a deflector body having one end of a flexible deflector secured thereto, the deflector body including a hook;
wherein a cooperative relationship between said protrusion and said hook resist detachment of said seal from the vehicle body, the hook overlaying the outward extending protrusion to prevent lifting of the protrusion and the seal upward from the generally horizontal surface.

2. The seal attachment assembly of claim 1, wherein said seal has an arcuate sealing profile extending upward from a planar base portion.

3. The seal attachment assembly of claim 2, wherein said seal includes a jut on said sealing profile.

4. The seal attachment assembly of claim 2, wherein said planar base portion of said seal is secured to the vehicle body by a double-sided tape.

5. The seal attachment assembly of claim 4, further including a resilient lip extending outward from said seal in a direction away from the sunroof opening along an outer edge of said planar base portion, the lip extending from the seal to the vehicle body for sheltering the double-sided tape.

6. The seal attachment assembly of claim 5, wherein said resilient lip maintains an elastic engagement with the vehicle body to shelter the double-sided tape from exposure to elements.

7. The seal attachment assembly of claim 1, wherein said protrusion extends outward from said seal in a direction toward the sunroof opening along an inner edge of said planar portion.

8. The seal attachment assembly of claim 7, wherein a terminal end of said protrusion includes a rounded bulb section, a cross-sectional area of said rounded bulb section is greater than a leg of said protrusion at said planar portion.

9. The seal attachment assembly of claim 1, wherein said deflector body includes a deflector catcher having at least a u-shaped portion forming a cavity, said cavity receiving a proximal end of a flexible deflector.

10. The seal attachment assembly of claim 9, wherein said u-shaped portion of said deflector catcher includes an inner leg and a generally parallel outer leg which both extend upward from opposing ends of a generally perpendicular base.

11. The seal attachment assembly of claim 10, wherein said outer leg travels in a plane transverse that of a planar base portion of said seal.

12. The seal attachment assembly of claim 11, wherein said outer leg extends beyond said planar base portion of said seal.

13. The seal attachment assembly of claim 12, wherein a terminal end of said protrusion includes a rounded bulb section, and wherein said outer leg terminates at an outward extending portion of said hook, said hook catches said rounded bulb of said protrusion of said seal.

14. A seal attachment assembly for a vehicle sunroof, comprising:
a seal having an arcuate sealing profile extending upward from a planar portion, said seal includes a protrusion extending outward from an inner edge of said planar portion;
a double-sided tape including a first surface opposite a second surface, said first surface adhered to said planar portion, and said second surface adhered to the vehicle body;
a garnish member that cooperatively braces said protrusion to maintain said seal firmly in place; and
wherein said seal further includes a resilient lip along an outer edge of said planar portion, said resilient lip maintains an elastic engagement to the vehicle body to shelter said double-sided tape from exposure to elements.

15. The seal attachment assembly of claim 14, wherein said garnish member is a deflector catcher having a u-shaped portion forming a cavity for receiving a proximal end of a flexible deflector, said deflector catcher having a hook that cooperatively engages said protrusion of said seal to resist movement of said seal away from the vehicle body.

16. The seal attachment assembly of claim 14, wherein a terminal end of said protrusion includes an upturned portion to which said hook clasps.

17. The seal attachment assembly of claim 15, wherein said u-shaped portion of said deflector catcher includes an inner leg and a generally parallel outer leg which both extend upward from opposing ends of a base, said outer leg extends upward beyond an underside surface of said planar portion of said seal, said hook of said deflector catcher is situated at a terminal end of said outer leg.

18. A seal attachment assembly for securing a sunroof seal to a vehicle body, comprising:
a seal having an arcuate sealing profile extending upward from a planar portion, said seal including:
a protrusion extending along an inner edge of said planar portion, and
a resilient lip disposed along an outer edge of said planar portion;
a deflector catcher having at least a u-shaped portion forming a cavity for receiving a proximal end of a flexible deflector, said u-shaped portion of said deflector catcher including:
an inner leg and a generally parallel outer leg which both extend upward from opposing ends of a base, and
a hook formed at a terminal end of said outer leg for cooperatively engaging said protrusion to resist movement of said seal away from the vehicle body.

19. The seal attachment assembly of claim 18 further including a double-sided tape having a first surface opposite a second surface,
wherein said planar portion of said seal presses against said first surface, and said second surface presses against the vehicle body, and
wherein said resilient lip of said seal maintains an elastic engagement to the vehicle body.

20. A seal attachment assembly for a vehicle sunroof, comprising:
a roof panel member having a generally horizontal wall portion and a perimeter wall portion depending downward from the horizontal wall portion to define a sunroof opening of the vehicle;
a seal mounted to an upper planar surface of the horizontal wall portion, the seal including a protrusion projecting toward the sunroof opening;
a garnish member having a leg disposed along and generally parallel to the perimeter wall portion, the leg having a hook projecting in a direction generally parallel to the horizontal wall portion, the hook received over the protrusion for holding the seal against the horizontal wall portion.

21. The seal attachment assembly of claim 20 wherein the seal includes a lip projecting away from the sunroof opening, the lip extending from the seal to the horizontal wall portion.

* * * * *